United States Patent
Chou et al.

(10) Patent No.: US 9,210,303 B2
(45) Date of Patent: Dec. 8, 2015

(54) LENS DISTORTION CORRECTION METHOD

(71) Applicant: Altek Semiconductor Corporation, Hsinchu (TW)

(72) Inventors: Hong-Long Chou, Taipei (TW); Yu-Chih Wang, Tainan (TW); Wen-Yan Chang, Miaoli County (TW); Yao-Sheng Wang, Tainan (TW)

(73) Assignee: ALTEK SEMICONDUCTOR CORPORATION, Hsinchu (TW)

( * ) Notice: Subject to any disclaimer, the term of this patent is extended or adjusted under 35 U.S.C. 154(b) by 84 days.

(21) Appl. No.: 14/294,250

(22) Filed: Jun. 3, 2014

(65) Prior Publication Data
US 2015/0304527 A1    Oct. 22, 2015

(30) Foreign Application Priority Data
Apr. 18, 2014   (TW) .............................. 103114287 A

(51) Int. Cl.
*H04N 5/217* (2011.01)
*G06T 7/00* (2006.01)
*H04N 17/00* (2006.01)

(52) U.S. Cl.
CPC .............. *H04N 5/217* (2013.01); *G06T 7/0018* (2013.01); *H04N 17/004* (2013.01)

(58) Field of Classification Search
CPC ..... H04N 5/217; H04N 17/004; G06T 7/0018
See application file for complete search history.

(56) References Cited

U.S. PATENT DOCUMENTS

| | | | | |
|---|---|---|---|---|
| 8,368,762 B1* | 2/2013 | Chen | ..................... | H04N 17/002 348/187 |
| 8,836,766 B1* | 9/2014 | Hebert | ............... | H04N 13/0275 348/135 |
| 2002/0041383 A1* | 4/2002 | Lewis, Jr. | ............... | H04N 5/217 358/1.9 |
| 2002/0122117 A1* | 9/2002 | Nakagawa | ............. | H04N 5/232 348/218.1 |
| 2008/0062164 A1* | 3/2008 | Bassi | ................... | H04N 9/3147 345/214 |
| 2011/0026014 A1* | 2/2011 | Mack | ..................... | G03B 13/22 356/124 |
| 2012/0007985 A1* | 1/2012 | Inui | ....................... | G06T 7/0018 348/148 |

\* cited by examiner

*Primary Examiner* — Jefferey Harold
*Assistant Examiner* — Sean Haiem
(74) *Attorney, Agent, or Firm* — Bacon & Thomas, PLLC

(57) ABSTRACT

The present disclosure illustrates a lens distortion correction method to solve influence for distortion correction caused by an alignment error between a lens center and a center of image sensor unit during assembling. The present disclosure is characterized in that the spatial geometric calibration is incorporated with the lens distortion correction and different image centers are selected repeatedly when transformation relationship of image coordinates is used to perform the lens distortion correction, so as to correct the image center of the image to be corrected and enhance the accuracy of lens distortion correction.

8 Claims, 3 Drawing Sheets

LENS DISTORTION CORRECTION METHOD

CROSS-REFERENCE TO RELATED APPLICATION

This application claims the benefit of Taiwan Patent Application No. 103114287, filed on Apr. 18, 2014, in the Taiwan Intellectual Property Office, the disclosure of which is incorporated herein in its entirety by reference.

BACKGROUND OF THE INVENTION

1. Field of the Invention

The present disclosure relates to a correction method, more particularly, to a method of utilizing a spatial geometric calibration to improve the accuracy of lens distortion correction.

2. Description of the Related Art

Common optical apparatuses use optic lenses for forming image, such as an image capture device. In image capture device, light transmits to the charge coupled device via optic lenses for forming image. The image forming depends on the optic lenses, so the design of the optic lenses affects the quality of a formed image directly.

The image capture device which forms image by the optic lenses has problem of chromatism and distortion in formed image. There are two typical distortion types. First distortion type is barrel distortion, the four side edges of the formed image is protrusive outward, compared to four corners. The other type is a pincushion distortion, the four side edges of the formed image is concave inward, compared to four corners. Due to the deformation cause by the optic lenses, the image of two parallel straight lines has various intervals at different imaging positions.

The deformation caused by the optic lenses makes the equal intervals between potions or lines become non equal on the image, so the image distortion occurs.

Basically, the image distortion has point symmetry with respect to the image center, and most image coordinate transformation relationships for correcting the deformed image include an image center parameter. Ideally, the lens center must be located on a normal line from the center of an image sensor unit in assembly of the optical lens and the image sensor unit, and the distortion causes the optic lenses can have point symmetry with respect to the image center of the image.

However, in practical assembly, the optic lens center is usually not located on the normal line from center of the image sensor unit due to tolerance of the optic lenses or fault occurred in assembly flow. Therefore, the distortion caused by the optic lenses cannot have point symmetry with respect to the image center of the image, and it makes the accuracy of correction decrease.

SUMMARY OF THE INVENTION

To solve the above-mentioned problems, one of objectives of the present disclosure is to provide a lens distortion correction method to improve the accuracy of lens distortion correction.

Another objective of the present disclosure is to provide a lens distortion correction method, in order to compensate the influence for the distortion correction caused by the misalignment between the lens center and center of the image sensor unit generated in assembly.

An exemplary embodiment of the present disclosure provides is to provide a lens distortion correction method which comprises following steps: step (a) of disposing a geometric calibration model in front of a lens module. The geometric calibration model is provided with calibration markers, and each calibration marker has a spacial coordinate; step (b) of using the lens module to capture an image to be corrected; step (c) of providing an image coordinate transformation relationship between the image to be corrected and the corrected image. The image coordinate transformation relationship includes an image center parameter; step (d) of selecting a candidate center point in the image to be corrected; step (e) of using coordinate of the candidate center point as the image center parameter, and transforming the image to be corrected into the corrected image by performing an image distortion correction according to the image coordinate transformation relationship. step (f) of calculating a plurality of geometric calibration parameters and an error value with an LMS algorithm based on the candidate center point, the spacial coordinates of calibration markers, and image coordinates of calibration markers in the corrected image; step (g) of selecting a plurality of different candidate center points in the image to be corrected sequentially for repeating step (e) to step (f), in order to generate a plurality of corresponding error values; step (h) of defining a candidate center point which includes a minimum value of the plurality of error values as the image center parameter of the image coordinate transformation relationship, and transforming the image to be corrected into the corrected image according to the image center parameter and the image coordinate transformation relationship.

Preferably, the geometric calibration model may be a plane model or a three dimensional model, and the spacial coordinates of calibration markers are of a global coordinate.

Preferably, the image coordinate transformation relationship has point symmetry with respect to the selected image center, to correct a barrel distortion or a pincushion distortion.

Preferably, the geometric calibration parameters are determined based on a pinhole model.

Preferably, the different candidate center points are adjacent to an image center point of the image to be corrected.

Preferably, the lens module comprises at least one lens and an image sensor unit.

Preferably, the image coordinate of the candidate center points are in unit of pixel or sub-pixel.

Preferably, the algorithm comprises a least mean square algorithm, an algorithm of calculating absolute value of distance difference, or an algorithm of calculating a sum of distance difference.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

Figure 1:
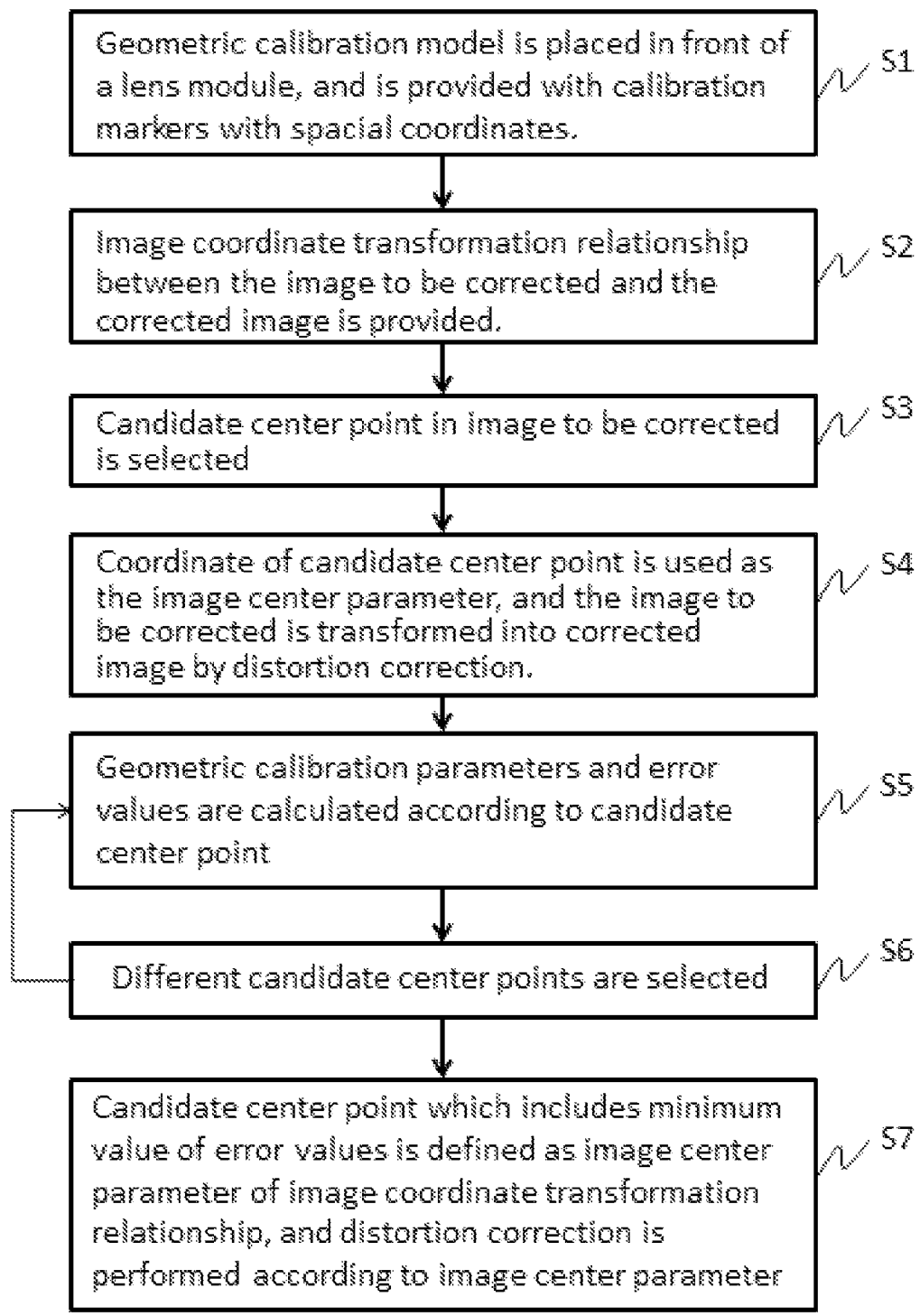
FIG. 1 is a flow diagram of a lens distortion correction method according to the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2:
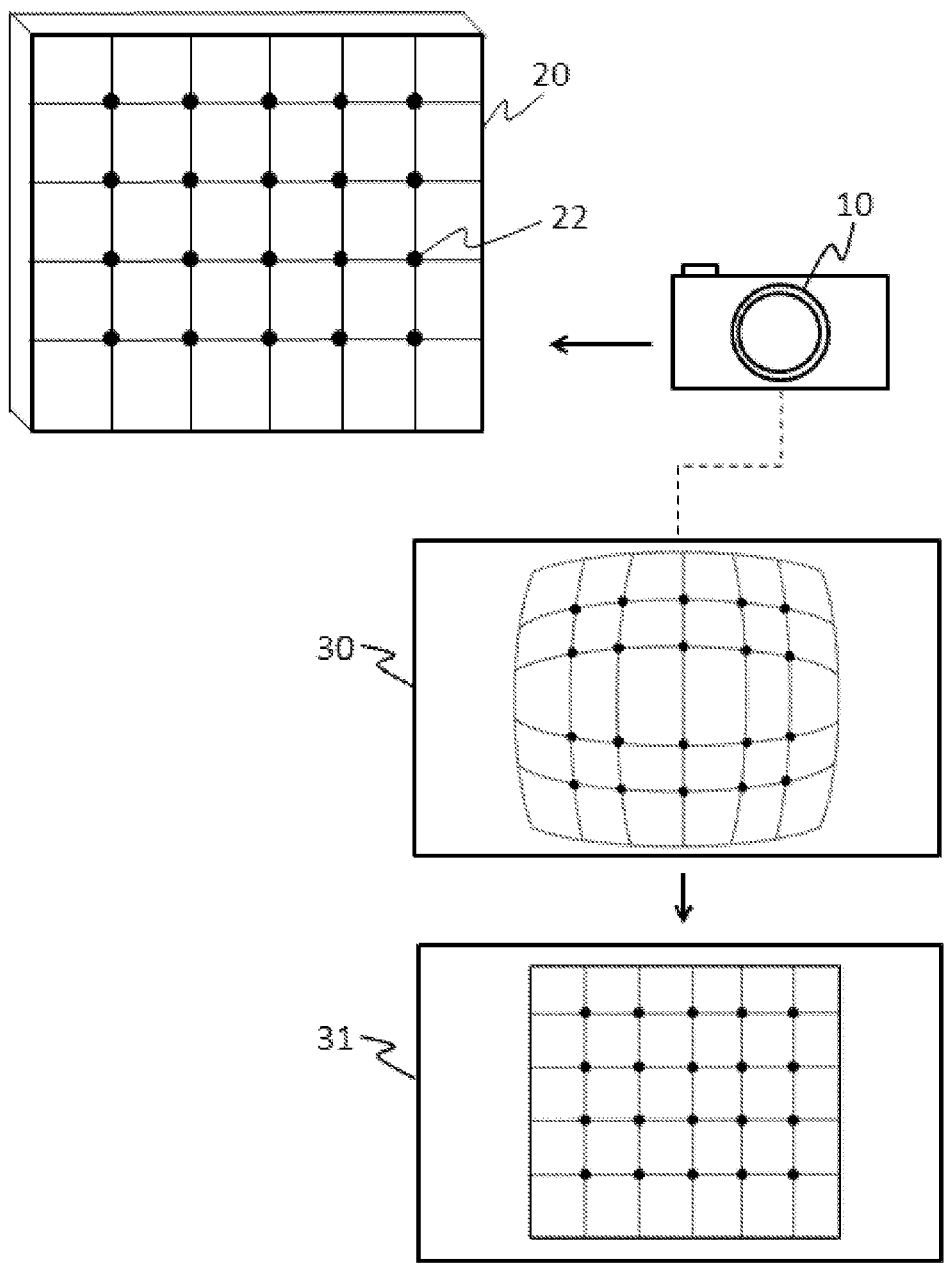
FIG. 2 is a flow diagram of an exemplary embodiment of the lens distortion correction method according to the present disclosure.

Refer to FIG. 1 and FIG. 2 which are flow diagram and schematic view of a lens distortion correction method according to the present disclosure. In FIG. 1 and FIG. 2, the lens distortion correction method according to the present disclosure is adapted for a lens module comprising at least one lens and an image sensor unit, and comprises the following steps.

In Step S1, a geometric calibration model 20 is placed in front of a lens module 10. The geometric calibration model 20 is provided with calibration markers, and each calibration marker 22 has a spacial coordinate. The lens module 10 is used to capture an image 30 to be corrected. In implementation, the geometric calibration model 20 may be a plane model or a three dimensional model, and the spacial coordinates 22 of calibration markers are of a global coordinate.

In FIG. 2, both of the deformed image 30 to be corrected and an idea corrected image 31 are illustrated. The barrel distortion of the image 30 to be corrected is shown in FIG. 2. Image points of the calibration markers 22 are arranged in arc. Besides, intervals between the image points in the image 30 to be corrected are not equal but spatial distances between the calibration markers are equal. The image points of the calibration markers 22 in the right corrected image should be arranged in straight line, such as the ideal corrected image 31 shown in FIG. 2.

In Step S2, an image coordinate transformation relationship between the image 30 to be corrected and the corrected image 31 is provided. The image coordinate transformation relationship includes an image center parameter, that is, the image coordinate transformation relationship needs a correct coordinate of image center. In implementation, the image coordinate transformation relationship is used to correct a barrel distortion or a pincushion distortion. The related algorithm is well known by the skilled persons in this technology field, so the detail description is omitted.

In Step S3, a candidate center point in the image 30 to be corrected is selected. In ideal situation, the coordinate of the image center is the half of length and width of the image. For example, if resolution of the image 30 to be corrected is 640×480, it means that the length is 640 pixels and the width is 480 pixels, the coordinate of the image center is (320, 240). However, the misalignment between the center of lens and the image sensor unit may occur in assembly, so (320, 240) is possible not the correct image center. The following steps are for selecting multiple candidate center points and cooperating with the spatial geometric calibration to search the more correct image center.

In Step S4, a coordinate of the candidate center point is used as the image center parameter, and the image 30 to be corrected is transformed into the corrected image by performing distortion correction according to the coordinate transformation relationship. Ideally, the corrected image is the same as the ideal corrected image 31 shown in FIG. 2, the image points of the calibration markers 22 are arranged in straight line and the intervals between the image pints of the calibration markers are equal. However, the image center deviation may exist, so a spatial geometric calibration is performed for further checking in following steps.

In Step S5, a plurality of geometric calibration parameters and an error value are by calculated according to the candidate center point, the spacial coordinates of calibration markers, and image coordinates of calibration markers in the corrected image. In implementation, the calculation method may comprise a least mean square algorithm, an algorithm of calculating absolute value of the distance difference, or an algorithm of calculating a sum of distance difference. This step is to perform a spatial geometric calibration, and each spacial coordinate can be calculated with the plurality of geometric calibration parameters to generate a corresponding image coordinate. The plurality of geometric calibration parameters are determined based on a pinhole model.

The spatial geometric calibration is based on a linear relationship. Ideally, if the image center is correct, there is no error value in calculation for geometric calibration parameters. However, in practice the misalignment may exist between the candidate center point and the real optic lens center, or there is pixel error in image coordinate, so what is output from the calculation are the proximal geometric calibration parameters and the error value. Preferably, the LMS algorithm is used to calculate these geometric calibration parameters. The principle of geometric calibration parameters and LMS algorithm are well known by the skilled persons in this technology field, so detail description is omitted.

Figure 3:
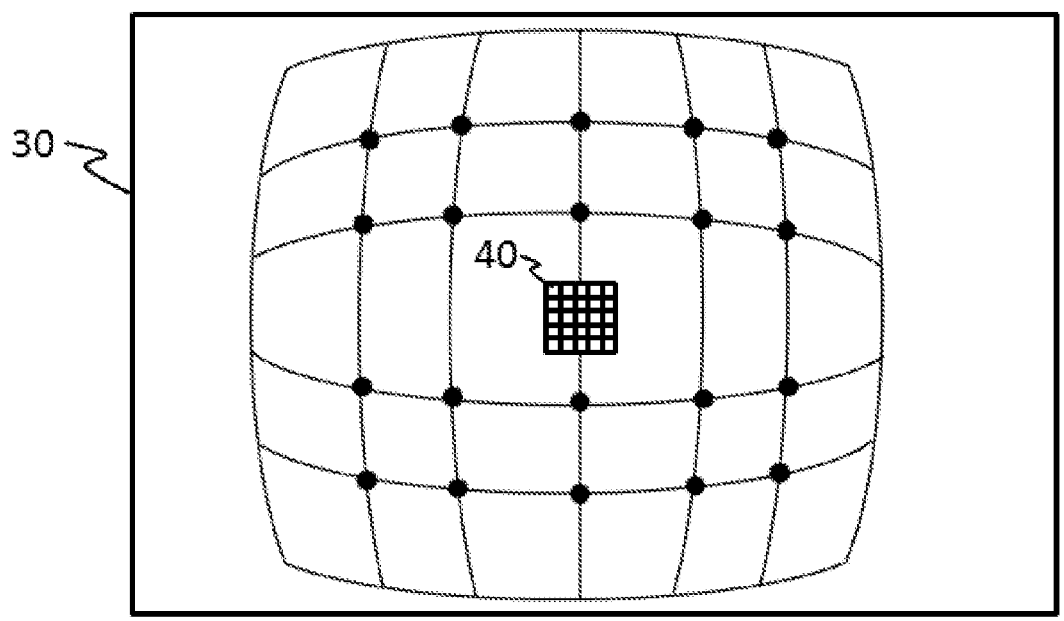
FIG. 3 is a schematic view of the exemplary embodiment of the lens distortion correction method according to the present disclosure.

In step S6, a plurality of different candidate center points 40 are selected in the image to be corrected sequential, for example, from the neighborhood of the image center of the image to be corrected. In implementation, a selection range is preset, and different candidate center points are selected sequential in an order of left to right and up to down in the preset range, as shown in FIG. 3. Alternatively, these different candidate center points can be selected from the image center to apart. In implementation, the positions of the candidate center points are in unit of pixel or sub-pixel. These candidate center points can be selected by 0.5 pixel, such as (320, 240), (320.5, 240), (321, 240), and (321.5, 240).

Next, the step S5 and step S6 are repeated to perform the spatial geometric calibration for each candidate center point 40, to generate corresponding error values.

In step S7, a candidate center point which includes a minimum value of the plurality of error values is used as the image center parameter of the image coordinate transformation relationship, and the image to be corrected is transformed into the corrected image according to the image center parameter and the image coordinate transformation relationship.

If the selected candidate center point aligns to the lens center, the image coordinates of the calibration markers are correct after the distortion correction performed according to the image coordinate transformation relationship, so the error value calculated by the spatial geometric calibration is minimum.

By performing step S1 to step S7, the more correct image position of the lens center can be found efficiently, so that the accuracy of the distortion correction can be improved.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A lens distortion correction method, comprising:
   (a) disposing a geometric calibration model in front of a lens module, wherein the geometric calibration model is provided with calibration markers, and each of the plurality of calibration markers has a spacial coordinate;
   (b) using the lens module to capture an image to be corrected;
   (c) providing an image coordinate transformation relationship between the image to be corrected and a corrected image, wherein the image coordinate transformation relationship includes an image center parameter;
   (d) selecting a candidate center point in the image to be corrected;
   (e) using the candidate center point as the image center parameter, and transforming the image to be corrected into the corrected image by performing an image distortion correction according to the image coordinate transformation relationship;
   (f) calculating a plurality of geometric calibration parameters and an error value with an algorithm based on the candidate center point, spacial coordinates of the plurality of calibration markers, and image coordinates of the plurality of calibration markers in the corrected image;
   (g) selecting a plurality of different candidate center points in the image to be corrected sequentially for repeating step (e) to step (f), in order to generate a plurality of corresponding error values; and
   (h) defining the candidate center point which includes a minimum value of the plurality of error values as the image center parameter of the image coordinate transformation relationship, and transforming the image to be corrected into the corrected image according to the image center parameter and the image coordinate transformation relationship.

2. The lens distortion correction method according to claim 1, wherein the geometric calibration model is a plane model or a three dimensional model, and the spacial coordinates of the plurality of calibration markers are of a global coordinate.

3. The lens distortion correction method according to claim 1, wherein the image coordinate transformation relationship is used to correct a barrel distortion or a pincushion distortion.

4. The lens distortion correction method according to claim 1, wherein the plurality of geometric calibration parameters are determined based on a pinhole model.

5. The lens distortion correction method according to claim 1, wherein the plurality of the different candidate center points are adjacent to an image center point of the image to be corrected.

6. The lens distortion correction method according to claim 1, wherein the lens module comprise at least one lens and an image sensor unit.

7. The lens distortion correction method according to claim 1, wherein the image coordinate of the candidate center points are in unit of pixel or sub-pixel.

8. The lens distortion correction method according to claim 1, wherein the algorithm comprises a least mean square algorithm, an algorithm of calculating absolute value of distance difference, or an algorithm of calculating a sum of distance difference.

* * * * *